(12) United States Patent
Rynkowski et al.

(10) Patent No.: US 11,052,467 B2
(45) Date of Patent: Jul. 6, 2021

(54) MACHINING SYSTEM

(71) Applicant: Siemens Aktiengesellschaft, Munich (DE)

(72) Inventors: Patrick Rynkowski, Kamp Lintfort (DE); Stefan Sellmann, Essen (DE); Roger Tobisch, Weilmünster (DE); Felix Vogt, Oberhausen (DE); Marat Visajtaev, Bottrop (DE)

(73) Assignee: SIEMENS ENERGY GLOBAL GMBH & CO. KG

( * ) Notice: Subject to any disclaimer, the term of this patent is extended or adjusted under 35 U.S.C. 154(b) by 44 days.

(21) Appl. No.: 16/482,064

(22) PCT Filed: Jan. 4, 2018

(86) PCT No.: PCT/EP2018/050203
§ 371 (c)(1),
(2) Date: Jul. 30, 2019

(87) PCT Pub. No.: WO2018/137909
PCT Pub. Date: Aug. 2, 2018

(65) Prior Publication Data
US 2019/0375025 A1 Dec. 12, 2019

(30) Foreign Application Priority Data
Jan. 30, 2017 (DE) .................. 10 2017 201 404.0

(51) Int. Cl.
*B23B 29/034* (2006.01)
*B23B 29/02* (2006.01)

(52) U.S. Cl.
CPC ...... *B23B 29/025* (2013.01); *B23B 29/03432* (2013.01)

(58) Field of Classification Search
CPC ......... Y10T 82/12; Y10T 82/21; Y10T 82/22; Y10T 408/5633; Y10T 408/5628;
(Continued)

(56) References Cited

U.S. PATENT DOCUMENTS 3,614,250 A * 10/1971 Connolly .................. B23B 3/26
  408/3
4,161,127 A *  7/1979 Tiffin ........................ B23B 3/26
  408/129
(Continued)

FOREIGN PATENT DOCUMENTS

DE   661714 C  *  6/1938  ....... B23B 29/03492
DE   667511 C  * 11/1938  ......... B23Q 11/0035
(Continued)

OTHER PUBLICATIONS

Description DE10328448A1 (translation) obtained at https://worldwide.espacenet.com/ (last visited Nov. 13, 2020).*
(Continued)

*Primary Examiner* — Ryan C Rufo
(74) *Attorney, Agent, or Firm* — Schmeiser, Olsen & Watts LLP

(57) ABSTRACT

Provided is a mobile machining system for a turning machining of inner surfaces of hollow-cylindrical components, in particular for machining valve seats. The machining system includes a second drive train and the third drive train in each case which preferably have a gear mechanism, in particular a planetary gear mechanism, which is arranged between the respective motor and the associated gearwheel which projects outward from the rotational part. This leads to a simple, inexpensive and space-saving construction.

5 Claims, 12 Drawing Sheets

(58) Field of Classification Search
CPC .......... Y10T 408/558; Y10T 408/5583; Y10T 408/5584; B23B 29/03432; B23B 29/025; B23B 29/0345; B23B 29/0346; B23B 29/03471; B23B 29/03482; B23B 29/03492; B23B 29/03439; B23B 29/03442; B23B 29/03453; B23B 29/03464; B23B 29/03475; B23B 29/03485; B23B 29/03496; B23B 29/03489; B23B 5/161; B23B 5/162; B23B 3/265; B23B 3/26; B23B 2215/72; B23B 2229/16; B23Q 9/0007; B23Q 9/0014; B23Q 9/0064

See application file for complete search history.

(56) References Cited

U.S. PATENT DOCUMENTS

| | | | |
|---|---|---|---|
| 4,411,178 A * | 10/1983 | Wachs | B23B 5/162 82/113 |
| 4,599,769 A * | 7/1986 | Latzko | B23B 29/03439 29/26 A |
| 4,672,852 A | 6/1987 | Gugel et al. | |
| 4,869,127 A * | 9/1989 | Ariyoshi | B23B 29/03439 475/1 |
| 5,030,041 A | 7/1991 | Marron | |
| 6,447,220 B1 | 9/2002 | Ricci | |
| 9,649,695 B1 * | 5/2017 | Smith | B23B 29/03435 |
| 10,413,971 B1 * | 9/2019 | Smith | B23B 29/02 |
| 2005/0155470 A1 * | 7/2005 | Ricci | B23B 29/02 82/1.2 |
| 2005/0204879 A1 | 9/2005 | Kwech et al. | |
| 2008/0060490 A1 | 3/2008 | Sorensen et al. | |
| 2010/0158624 A1 | 6/2010 | Greisl et al. | |
| 2014/0102269 A1 * | 4/2014 | Tan | B23B 29/03439 82/123 |
| 2016/0368109 A1 * | 12/2016 | Place | B23B 29/03407 |
| 2016/0375509 A1 * | 12/2016 | Pierce | B23B 29/03453 83/54 |
| 2016/0377160 A1 * | 12/2016 | Mori | B23K 37/027 173/37 |

FOREIGN PATENT DOCUMENTS

| | | | | |
|---|---|---|---|---|
| DE | 2734126 A1 * | 2/1979 | | B23B 29/02 |
| DE | 3329483 A1 | 3/1985 | | |
| DE | 10328448 A1 * | 1/2005 | | B23B 29/03492 |
| DE | 102008044352 A1 | 7/2010 | | |
| EP | 1671724 A2 | 6/2006 | | |
| EP | 2644301 A1 * | 10/2013 | | B23B 5/162 |
| WO | WO-8401736 A1 * | 5/1984 | | B23B 3/26 |

OTHER PUBLICATIONS

PCT International Search Report and Written Opinion of International Searching Authority dated Apr. 24, 2018 corresponding to PCT International Application No. PCT/EP2018/050203 filed Jan. 4, 2018.

* cited by examiner

MACHINING SYSTEM

CROSS-REFERENCE TO RELATED APPLICATIONS

This application claims priority to PCT Application No. PCT/EP2018/050203, having a filing date of Jan. 4, 2018, which is based on German Application No. 10 2017 201 404.0, having a filing date of Jan. 30, 2017, the entire contents both of which are hereby incorporated by reference.

FIELD OF TECHNOLOGY

Provided is a mobile machining system for turning machining of inner faces of hollow-cylindrical components, in particular for machining valve seats.

BACKGROUND

It is frequently necessary during the servicing of power plants to machine the valve seats of existing valves for the purpose of maintenance. For this purpose, mobile machining systems of the type mentioned at the outset are used. The mobile machining systems in question here are distinguished firstly by a modular construction which can be dismantled into its individual modules for transport purposes and does not require a stationary machine bed, and secondly by the fact that solely the tool, but not the component to be machined, is moved during the machining. Accordingly, the machining of a valve can readily take place directly in the power plant, which is highly desirable in order to reduce downtimes and costs.

For the turning machining, the machining system requires at least a C-axis, about which the tool is driven rotationally, a Z-axis which, in the state of the machining system in which it is oriented correctly, extends parallel to the longitudinal axis of the component to be machined, and an X-axis which extends perpendicularly with respect to the Z-axis and via which the tool infeed takes place.

Proceeding from this known art, it is an aspect of the present invention to provide a mobile machining system of the type mentioned at the outset, in the case of which the rotational movement of the tool about the C-axis and the linear movements of the tool along the Z-axis and the X-axis are realized in a simple and inexpensive way.

SUMMARY

In order to achieve said aspect, the present invention provides a mobile machining system of the type mentioned at the outset, comprising a base part, a rotational part of hollow configuration which extends through the base part, is mounted on the latter such that it can be rotated about a C-axis of the machining system, and defines a first flange region on the end side, a guide rod which, at one of its free ends, has a second flange region which is connected fixedly to the first flange region of the rotational part so as to rotate with it and which defines a Z-axis of the machining system, which Z-axis extends parallel to the C-axis, a first motor which is connected fixedly to the base part so as to rotate with it and drives the guide rod via a first drive train such that it rotates about the C-axis, a support which is held on the guide rod such that it can be moved to and fro in the direction of the Z-axis, a second motor which is connected fixedly to the rotational part so as to rotate with it, is supplied with power via a slide ring, and drives the support via a second drive train, a tool holder which is held on the support such that it can be moved in the direction of an X-axis of the machining system, which X-axis extends perpendicularly with respect to the Z-axis, a third motor which is connected fixedly to the rotational part so as to rotate with it, is supplied with power via a or the slide ring, and drives the tool holder via a second drive train, an outer clamping device which is connected fixedly to the base part so as to rotate with it and is designed to fasten the base part centrally to an end side of a component to be machined, and an inner clamping device which is mounted on the guide rod and is designed to support the machining system on an inner face of the component to be machined.

Thanks to the fact that the second motor and the third motor rotate together with the rotational part and accordingly with the guide rod during the machining, which is ultimately made possible by way of the use of the at least one slide ring, the second drive train and the third drive train for realizing the movements of the tool holder along the Z-axis and X-axis can be of comparatively simple and inexpensive configuration.

The first drive train preferably has a gear mechanism which is connected to the first motor, in particular a planetary gear mechanism, a first toothed belt pulley which is driven via the gear mechanism, and a second toothed belt pulley which is connected fixedly to the rotational part so as to rotate with it, which toothed belt pulleys are connected to one another via a toothed belt. In this way, the rotational movement of the tool holder about the C-axis is implemented in a structurally simple way.

One advantageous refinement of the machining system according to the embodiment of the invention is distinguished by the fact that the second drive train has at least one gearwheel which is held fixedly in the end region of a first gearwheel shaft so as to rotate with it, which first gearwheel shaft extends through the rotational part and is driven by the second motor, that the third drive train has at least one gearwheel which is held fixedly in the end region of a second gearwheel shaft so as to rotate with it, which second gearwheel shaft extends through the rotational part and is driven by the third motor, that the two gearwheels are arranged in a central region close to the C-axis and project outward from the rotational part, a shortest spacing between the tip circle diameters of the two gearwheels being, in particular, from 15 mm to 45 mm, and that the second and the third drive train in each case have at least one further gearwheel which is arranged rotatably on the guide rod within the second flange region and meshes with the associated gearwheel which projects outward from the rotational part.

A first essential advantage of a construction of this type consists in that further components of the second and third drive train can be attached simply to the two further gearwheels which are held within the second flange region on the guide rod. Thus, for example, a recirculating ball spindle which extends parallel to the C-axis and along the guide rod can be driven via the further gearwheel of the second drive train, which further gearwheel is arranged within the second flange region of the guide rod, via which recirculating ball spindle the movement of the support and therefore of the tool holder in the Z-direction is realized. The further gearwheel of the third drive train, which further gearwheel is arranged within the second flange region of the guide rod, can rotationally drive, for example, a drive rod with a polygonal cross section, which drive rod extends parallel to the C-axis and in turn drives a toothed belt drive which then, for example with an angular gear mechanism connected in between, drives one or more recirculating ball spindles which is/are provided on the support in order to move the tool holder in the X-direction.

The second drive train and the third drive train in each case preferably have a gear mechanism, in particular a planetary gear mechanism, which is arranged between the respective motor and the associated gearwheel which projects outward from the rotational part. This leads to a simple, inexpensive and space-saving construction.

In accordance with one advantageous refinement of the present embodiment of the invention, a plurality of guide rods of different diameter with associated supports, tool holders and inner clamping devices are provided which in each case define a second flange region which is designed for fastening to the first flange region of the rotational part. Thanks to a plurality of this type of guide rods which can optionally be fastened to the same rotational part, the machining system can be adapted in a flexible manner to different machining requirements. In particular, the above-described arrangement of the two gearwheels which project outward from the rotational part in a central region close to the C-axis is advantageous in the case of the use of a plurality of guide rods of different diameter, in so far as the attachment of the guide rod-side drive components of the second and third drive train can take place simply via a suitable selection and arrangement of the further gearwheels which are to be arranged within the second flange region.

The base part, the rotational part and the three motors are preferably combined in a single drive module. This is advantageous, in particular, in conjunction with the provision of a plurality of guide rods of different diameter, in so far as the individual drive module can be used for all guide rods.

BRIEF DESCRIPTION

Some of the embodiments will be described in detail, with reference to the following figures, wherein like designations denote like members, wherein.

DETAILED DESCRIPTION

Figure 1:
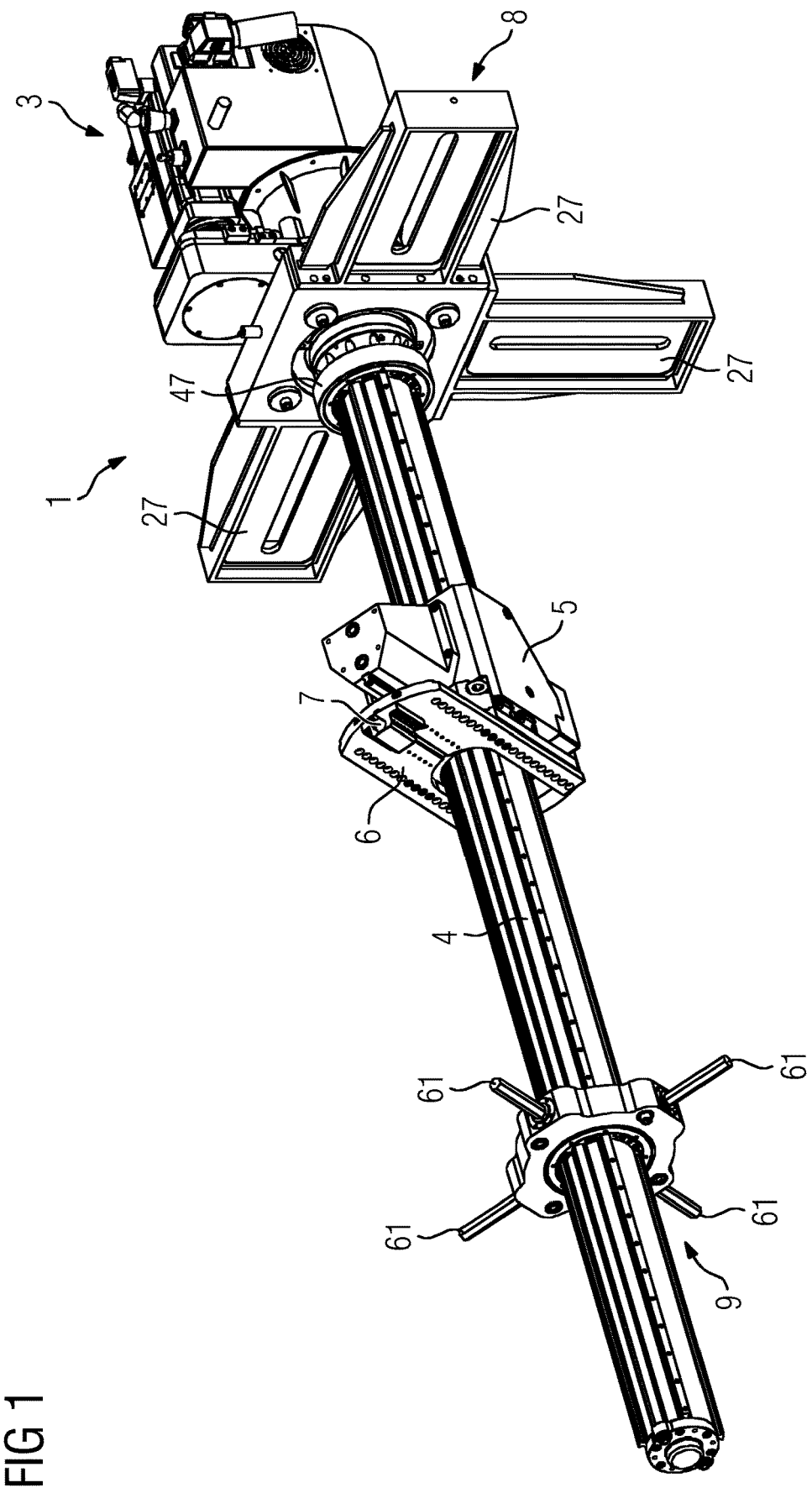
FIG. 1 shows a perspective view which shows a mobile machining system in accordance with one embodiment of the present invention.
Figure 2:
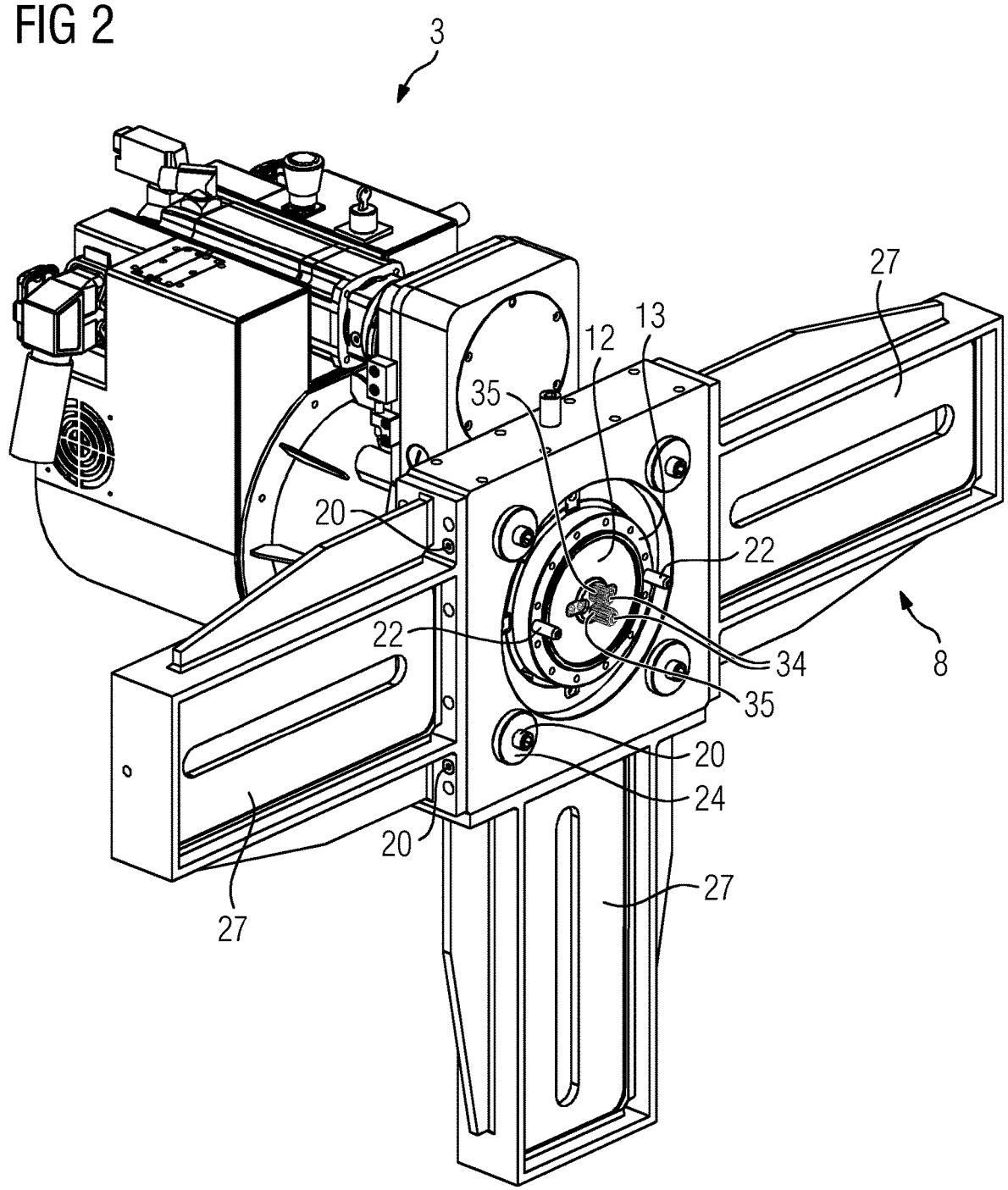
FIG. 2 shows a perspective view of a drive module of the machining system which is shown in FIG. 1.
Figure 3:
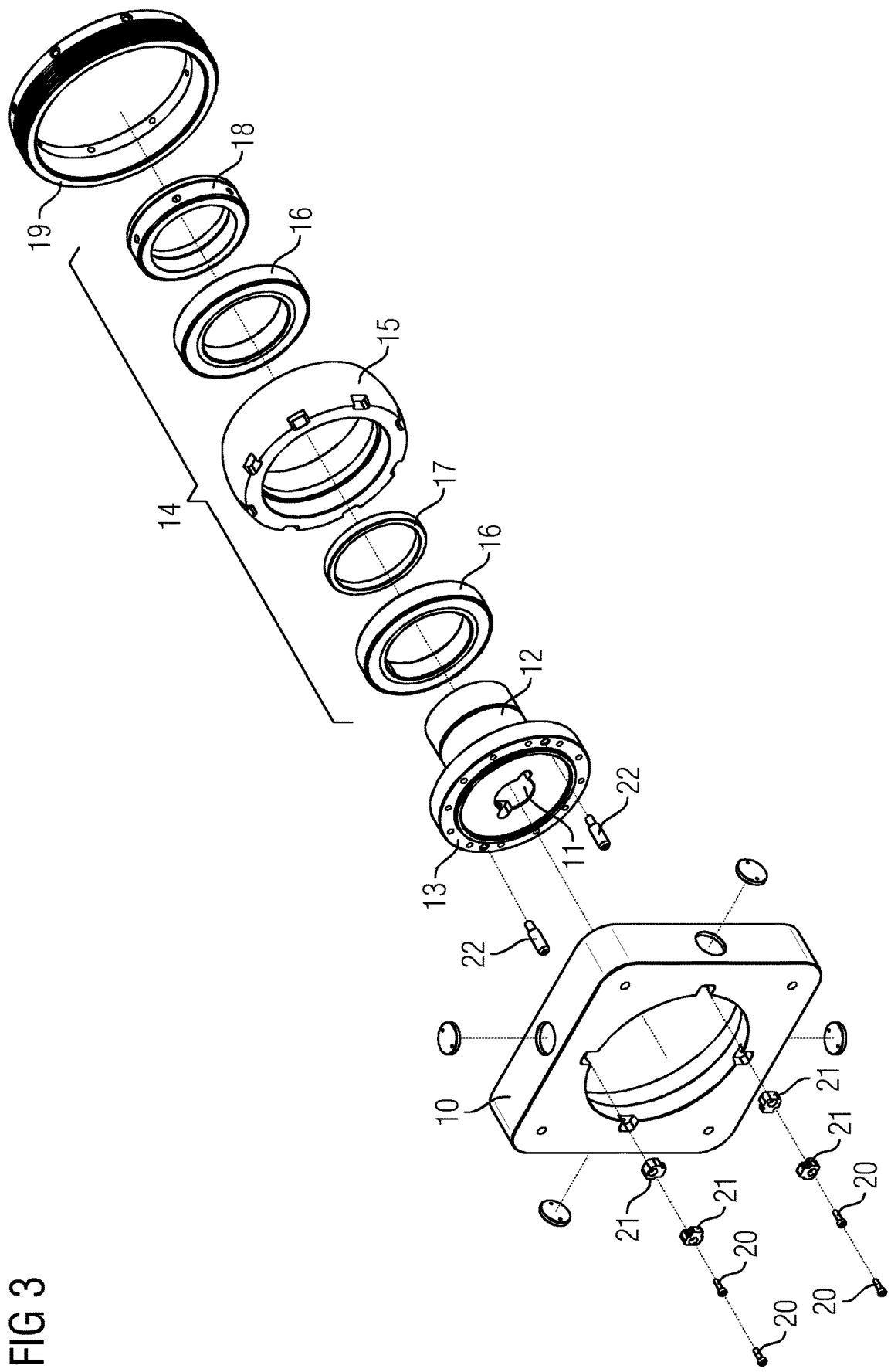
FIG. 3 shows an exploded view of components of the drive module which is shown in FIG. 2.
Figure 4:
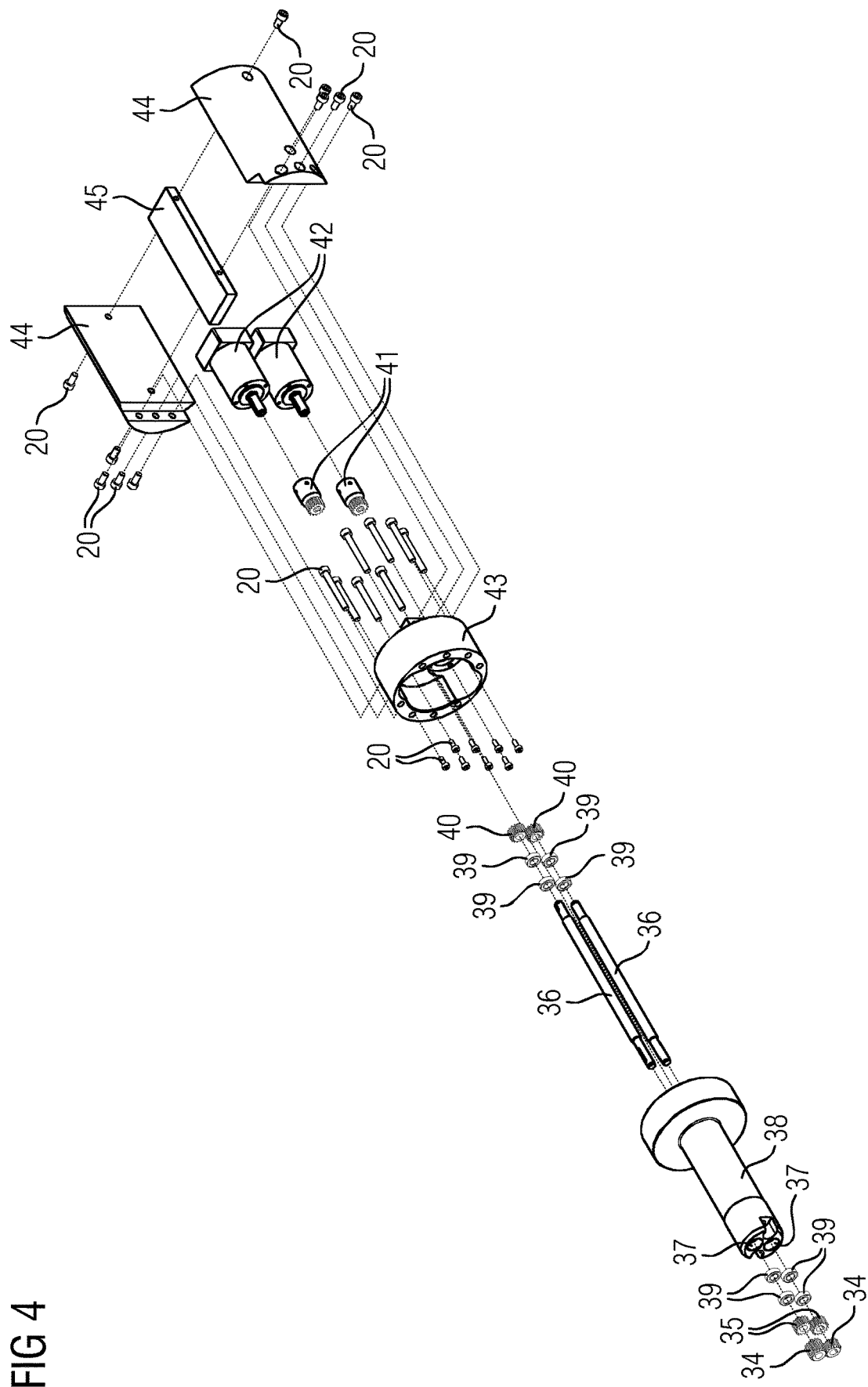
FIG. 4 shows an exploded view of further components of the drive module which is shown in FIG. 2.

The figures show a mobile machining system 1 in accordance with one embodiment of the present invention which serves to subject inner faces of hollow-cylindrical components 2 to turning machining. The machining system 1 is of modular construction. It comprises a drive module 3, a guide rod 4 which is connected releasably to the drive module 3 and can be rotated about a C-axis, a support 5 which is held on the guide rod 4 such that it can be dismantled and can be moved along the guide rod 4 along a Z-axis, a tool holder 6 which is arranged on the support 5, can be moved radially along an X-axis which is arranged perpendicularly with respect to the Z-axis and is designed for receiving a tool 7, in particular for receiving a turning tool, an outer clamping device 8 which is fastened releasably to the drive module 3 and is designed to fasten the machining system 1 to an end side of a component 2 to be machined, and an inner clamping device 9 which is mounted on the guide rod and is designed to support the machining system 1 on an inner face of the component 2 to be machined.

The drive module 3 has a base part 10 which forms a main bearing housing in the present case, and a rotational part 12 which is of hollow and frustoconical configuration, is provided with a through opening 11, extends through the base part 10, is mounted on the latter such that it can be rotated about the C-axis, and defines a first flange region 13 on the end side. The mounting is formed by way of a bearing 14 which has a spherical inner ring 15, on which two angular contact ball bearings 16 are held in a manner which is separated from one another by way of a spacer ring 17 and are set via an adjusting nut 18. The fixing of the bearing 14 on the base part 10 is realized via a spherical pressing ring 19. Securing of the spherical inner ring 15 against movement in the circumferential direction takes place via anti-rotation safeguard elements 21 which are held on the base part 10 via fastening screws 20. Centering pins 22 which project parallel to the C-axis are fastened to the first flange region 13 of the rotational part 12 so as to lie circumferentially opposite one another, which centering pins 22 assist the correct mounting of the guide rod 4 on the rotational part 12, as will be described in greater detail in the following text. A cover-like fastening bracket 23 is pushed over the base part 10 starting from the front side, and is fixed on said base part 10 with the use of fastening screws 20 and associated washers 24, the end-side region of the rotational part 12 including its first flange region 13 being accessible via a circular access opening 25 which is configured in the fastening bracket 23. In each case one outwardly projecting threaded pin 26 is positioned on the four side faces of the fastening bracket 23 which lie opposite one another in pairs. Said threaded pins 26 serve for precision setting of the entire machining system 1 with respect to the rotational axis of a component 2 to be machined.

Furthermore, the drive module 3 comprises a first motor 28 which is connected fixedly to the base part 10 so as to rotate with it and drives the guide rod 4 via a first drive train in a rotational manner about the C-axis. In the present case, the first drive train has a gear mechanism 29 which is connected to the first motor 28 in the form of a planetary gear mechanism, a first toothed belt pulley which is fastened to the mechanism driveshaft, and a second toothed belt pulley which is connected fixedly to a section of the rotational part 12 so as to rotate with it, which section projects from the base part 10 on the rear side, which toothed belt pulleys are connected to one another via a toothed belt. The two toothed belt pulleys and the toothed belt itself are received in a housing 30 which is fastened to the base part 10 and is provided with a through opening which is arranged so as to be flush with the through opening 11 of the rotational part 12. On account of the fact that the two toothed belt pulleys and the toothed belt form a simple belt drive and the precise configuration of the first drive train in relation to the embodiment of the invention on which the application is based is of secondary importance, a detailed illustration of the first drive train has been dispensed with in the present case.

Figure 5:
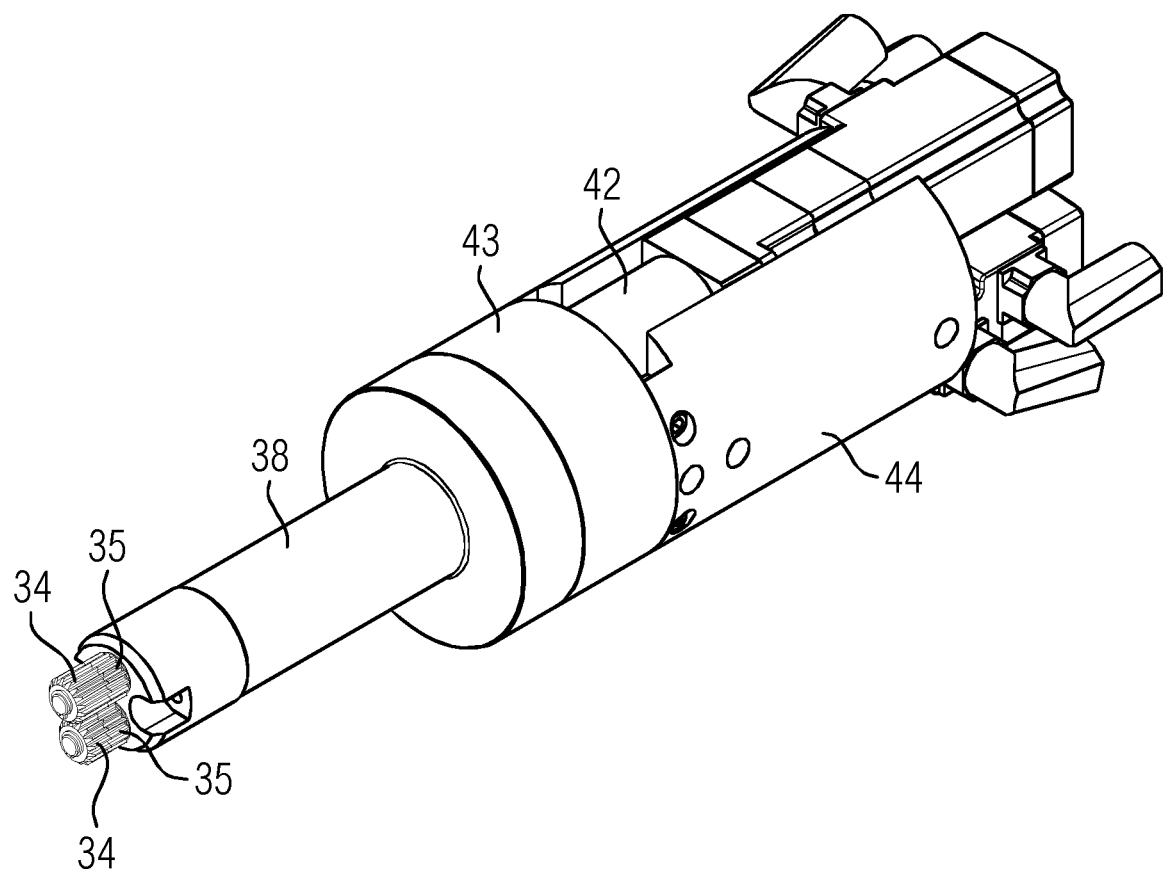
FIG. 5 shows a perspective view of the components which are shown in FIG. 4, in the assembled state.
Figure 6:
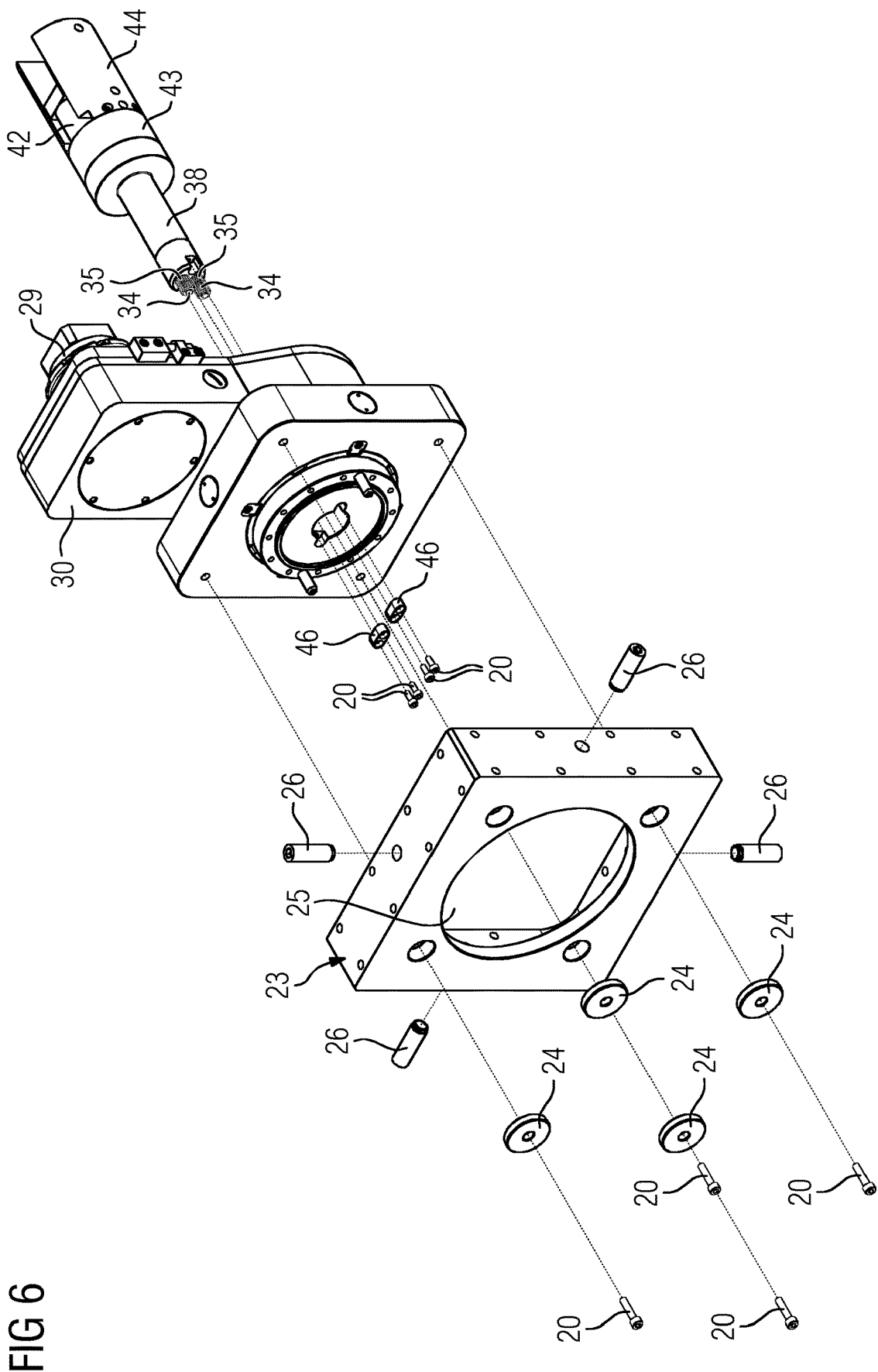
FIG. 6 shows a further exploded view of components of the drive module which is shown in FIG. 2, including the arrangements which are shown in FIGS. 3 to 5.
Figure 7:
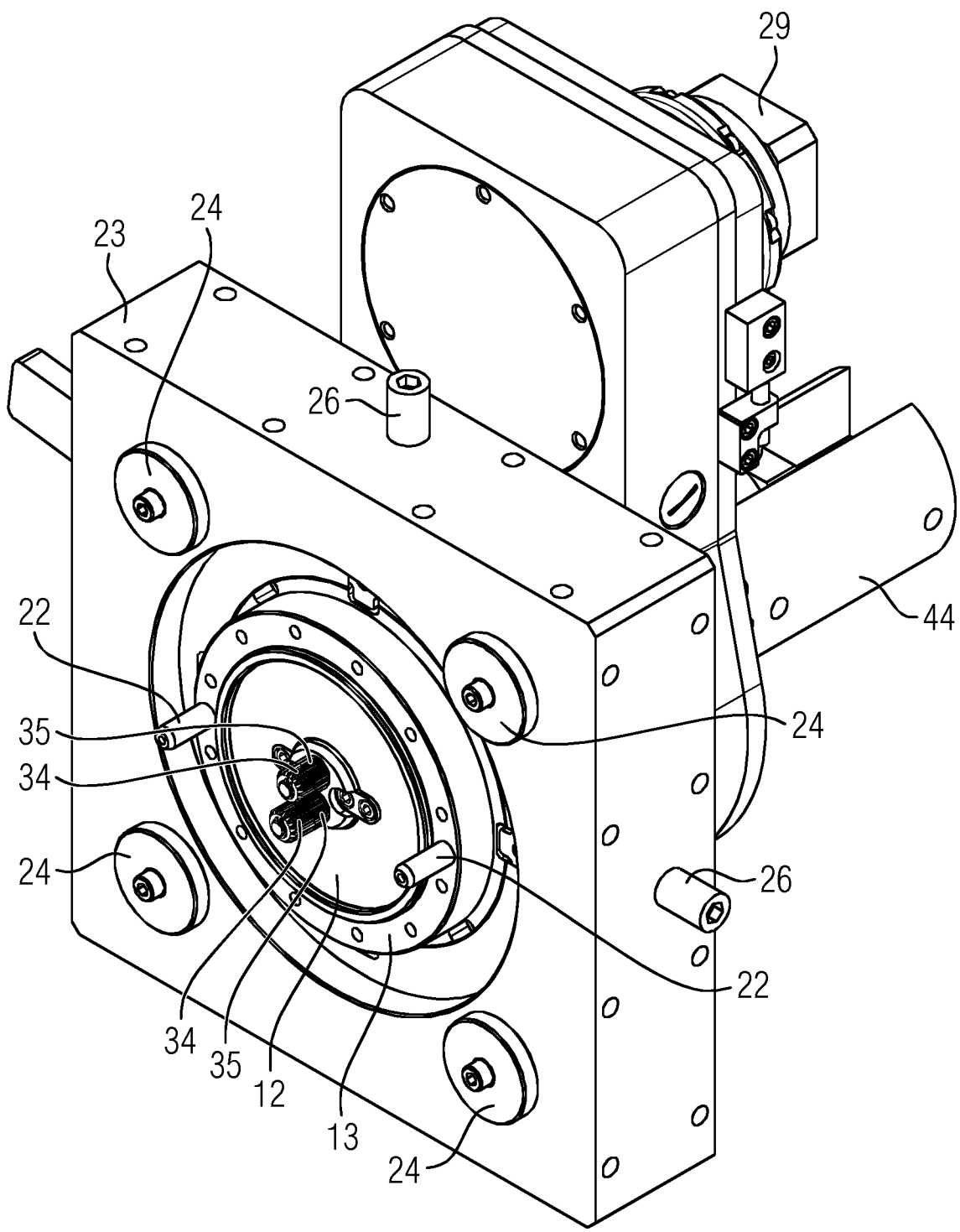
FIG. 7 shows a view of the components which are shown in FIG. 6, in the assembled state.
Figure 8:
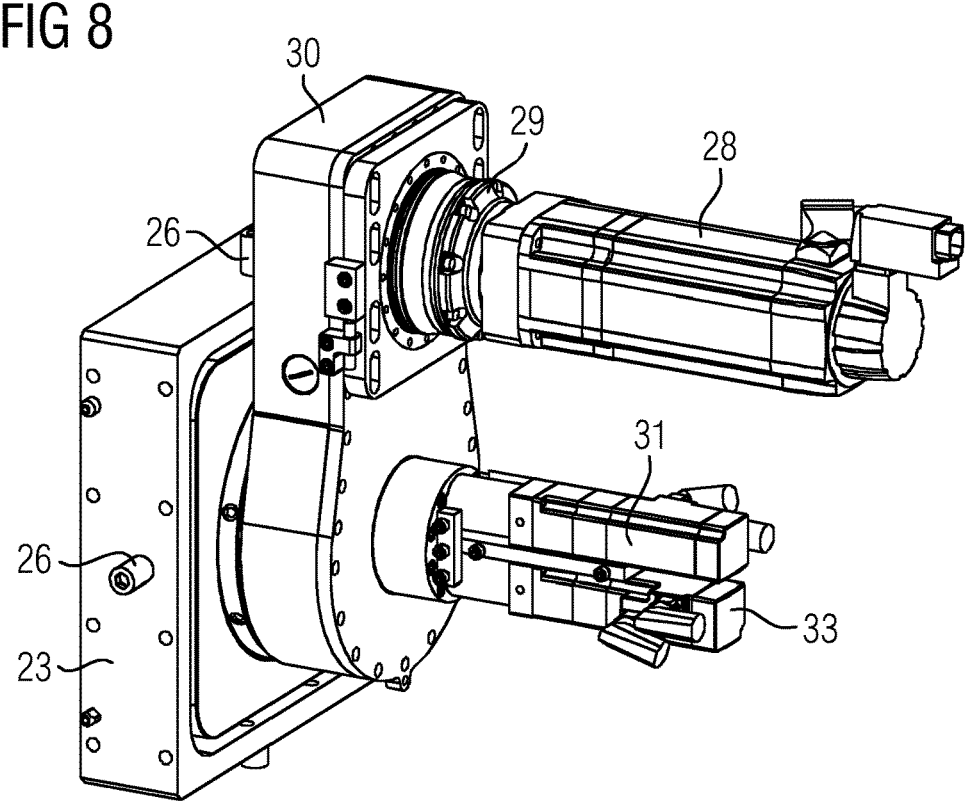
FIG. 8 shows a perspective view of the arrangement which is shown in FIG. 7, with mounted motors.
Figure 9:
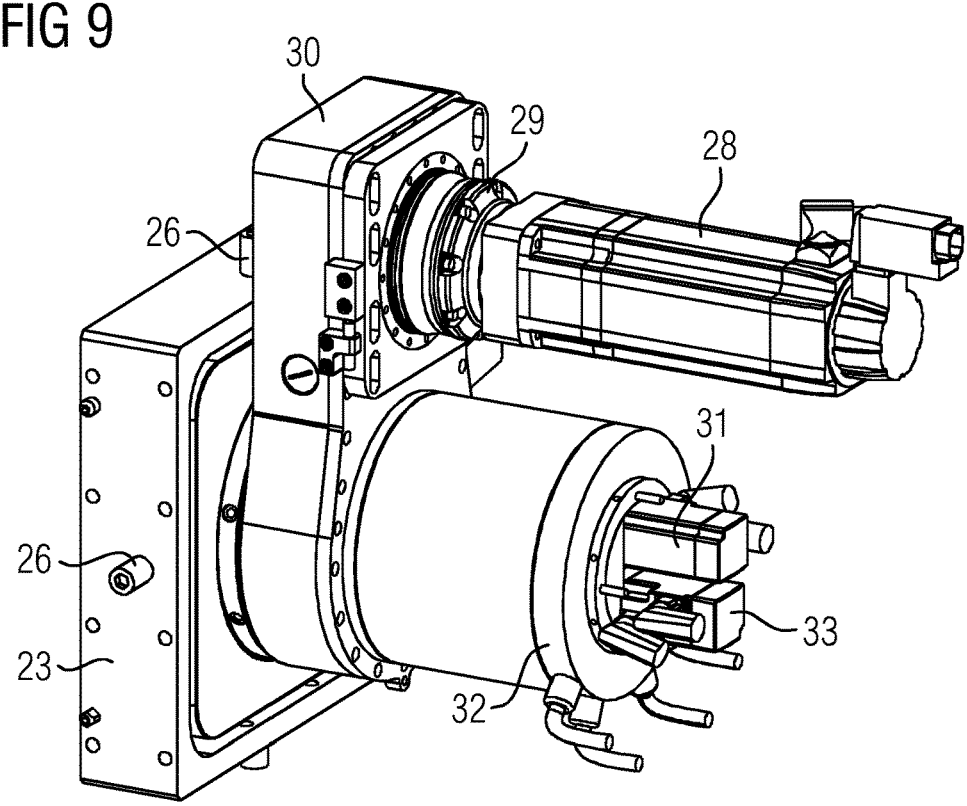
FIG. 9 shows a perspective view of the arrangement which is shown in FIG. 8, supplemented by a covering and a slide ring.

Furthermore, the drive module 3 comprises a second motor 31 which is connected fixedly to the rotational part 12 so as to rotate with it, is supplied with power via a slide ring 32, and drives the support 5 via a second drive train, and a third motor 33 which is connected fixedly to the rotational part 12 so as to rotate with it, is likewise supplied with power via the slide ring 32, and drives the tool holder 6 via a third drive train. On the side of the drive module 3, the second drive train and the third drive train in each case comprise two gearwheels 34 and 35 which are arranged axially directly behind one another, the gearwheels 34 forming guide gearwheels made from a softer material which facilitate the arranging of the guide rod 4, as will be described in greater detail in the following text. The gearwheels 34 and 35 are arranged in a central region close to the C-axis and project outward from the rotational part 12, a shortest spacing a between the tip circle diameters of the gearwheels 34 of the respective drive trains being between 15 mm and 45 mm. The gearwheels 34, 35 are in each case held fixedly in the region of the free end of an associated gear wheel shaft 36 so as to rotate with it, the gear wheel shafts 36 extending through associated bores 37 of a spindle drive shaft 38 and being mounted rotatably on the latter via corresponding ball bearings 39. Intermediate gearwheels 40 are fastened fixedly in the region of the opposite free end of the respective gearwheel shafts 36 so as to rotate with them, which intermediate gearwheels 40 mesh with associated gearwheel shafts 41 which are driven in each case via a planetary gear mechanism 42 by the second motor 31 firstly and the third motor 33 secondly. A gear mechanism holder 43 which receives the gearwheel shafts 38 and is of ring-like configuration is fastened to the spindle drive shaft by means of fastening screws 20, on which spindle drive shaft the two planetary gear mechanisms 42 are in turn mounted. Furthermore, two fastening plates 44 are screwed to the gear mechanism holder 43, which fastening plates 44 are connected to one another via a further fastening plate 45 and protect the planetary gear mechanism 43 against external influences. The arrangement which is shown in FIG. 5 and is produced in this way is pushed from the rear into the through opening 11 of the base part 10 (see FIG. 6), whereupon the spindle drive shaft 38 is connected fixedly to the rotational part 12 so as to rotate with it via corresponding positioning elements 46 and fastening screws 20.

Figure 10:
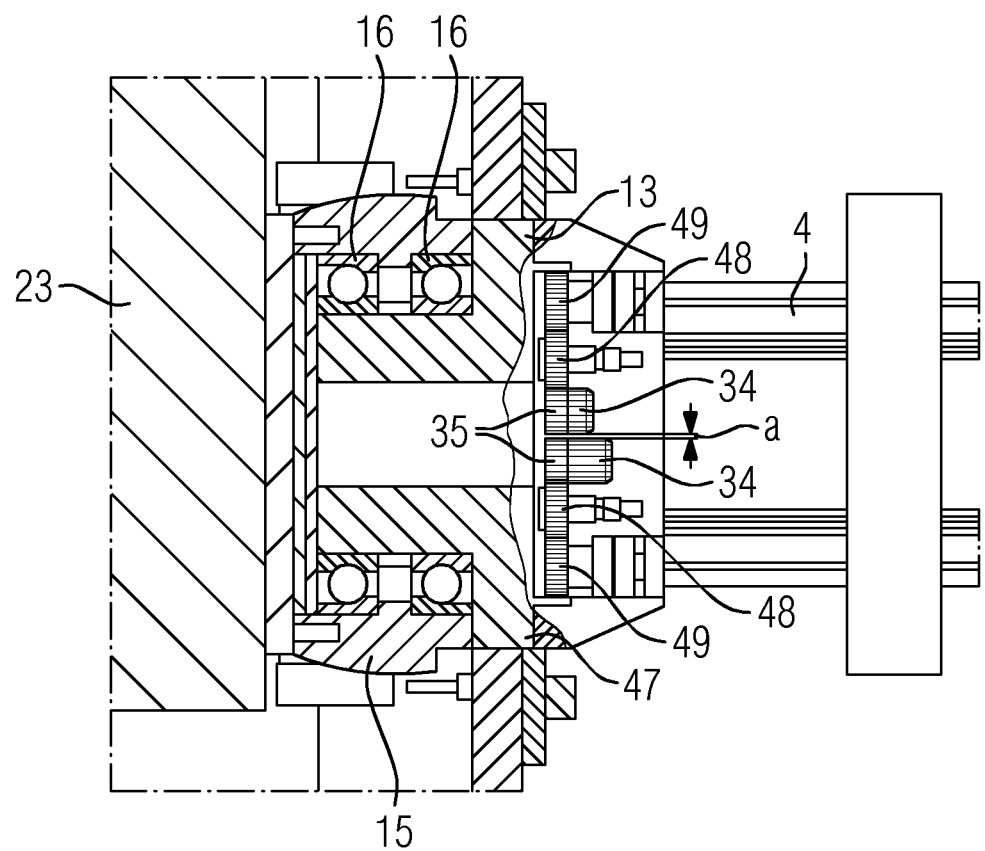
FIG. 10 shows a partial sectional view along the line X-X in FIG. 7, a first guide rod being mounted on a rotational part which is shown in FIG. 7.
Figure 11:
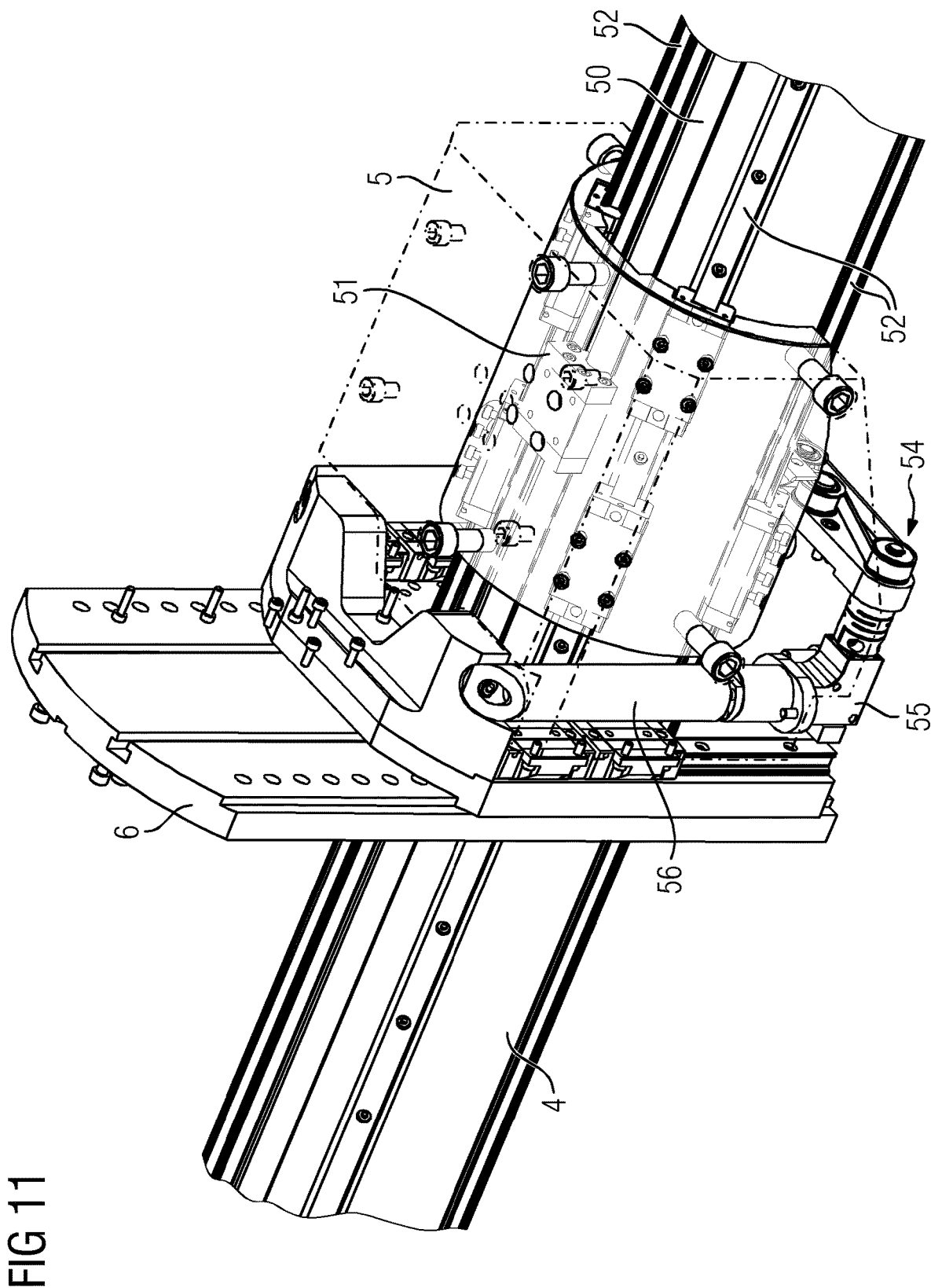
FIG. 11 shows a perspective plan view of the first guide rod in the region of a support.
Figure 12:
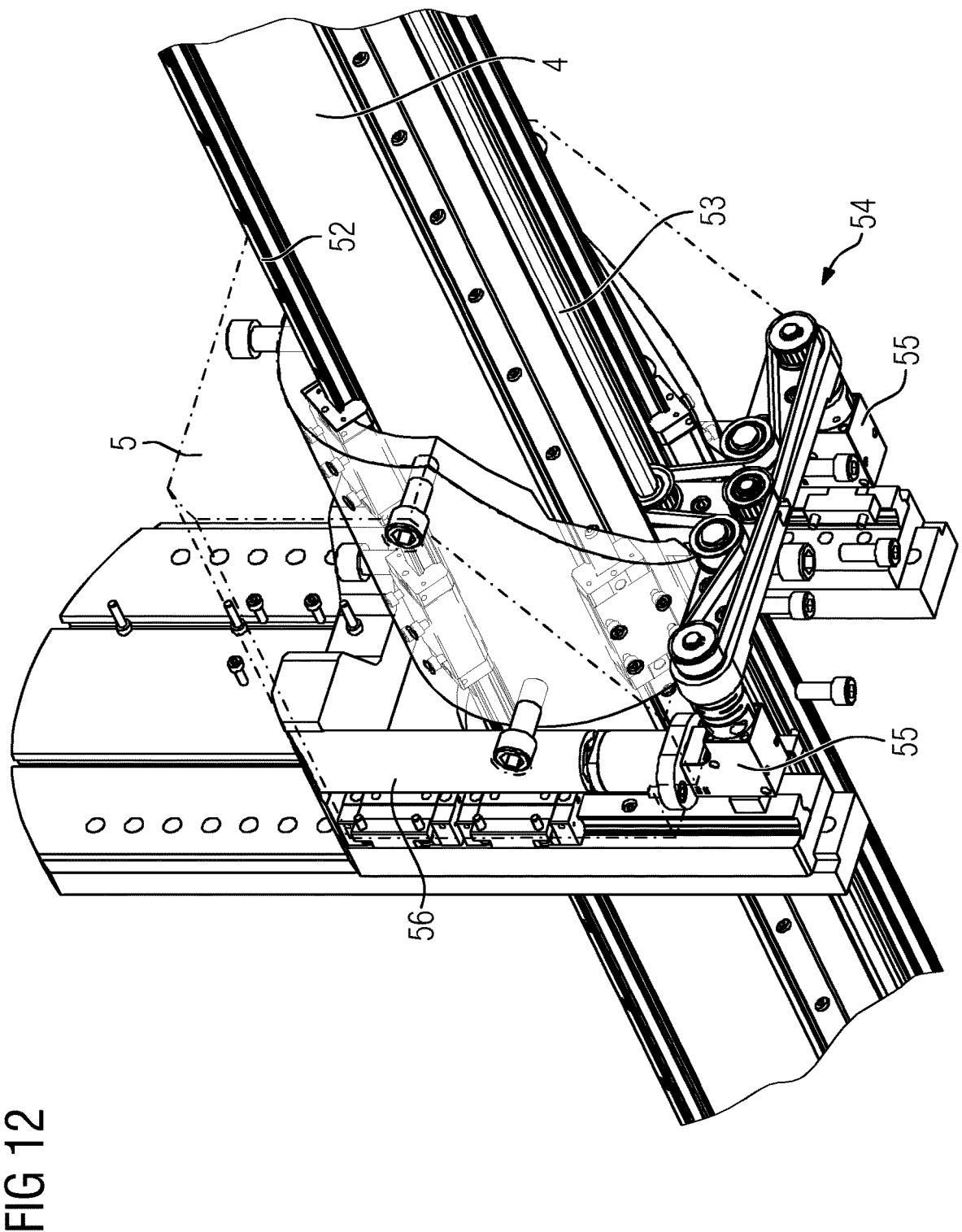
FIG. 12 shows a perspective view from below of the first guide rod in the region of the support.

At its free end which faces the rotational part 12, the guide rod 4 comprises a second flange region which is connected releasably via corresponding fastening screws 20 to the first flange region of the rotational part 12, as shown, in particular, in FIGS. 1 and 10. Further gearwheels 48, 49 are arranged on the guide rod 4 within the second flange region 47, which further gearwheels 48, 49 are driven by way of the gearwheels 34 and 35 which project axially outward from the rotational part 12, and which further gearwheels 48, 49 continue the second and third drive train, respectively, on the side of the guide rod 4. In the present case, the further gearwheels 48 and 49 of the second drive train actuate a threaded spindle 50, on which a recirculating ball nut 51 which is connected fixedly to the support 5 is held in such a way that the support 5 which is guided on the guide rod 4 along corresponding guides 52 is moved selectively to and fro in the Z-direction by way of corresponding rotation of the threaded spindle 50. The further gearwheels 48 and 49 of the third drive train rotate a drive rod 53 which extends parallel to the C-axis, has a polygonal cross section, and is mounted on the guide rod 4. The drive rod 53 in turn drives a toothed belt drive 54 of the support 5, which toothed belt drive 54 then synchronously drives, with angular gear mechanisms 55 connected in between, two recirculating ball spindles 56 (concealed here by way of the guide tube) of the support 5 which extend in the X-direction and on which the tool holder 6 is held. Accordingly, the tool holder 6 with the tool which is held on it can be selectively moved to and fro in the X-direction.

Figure 13:
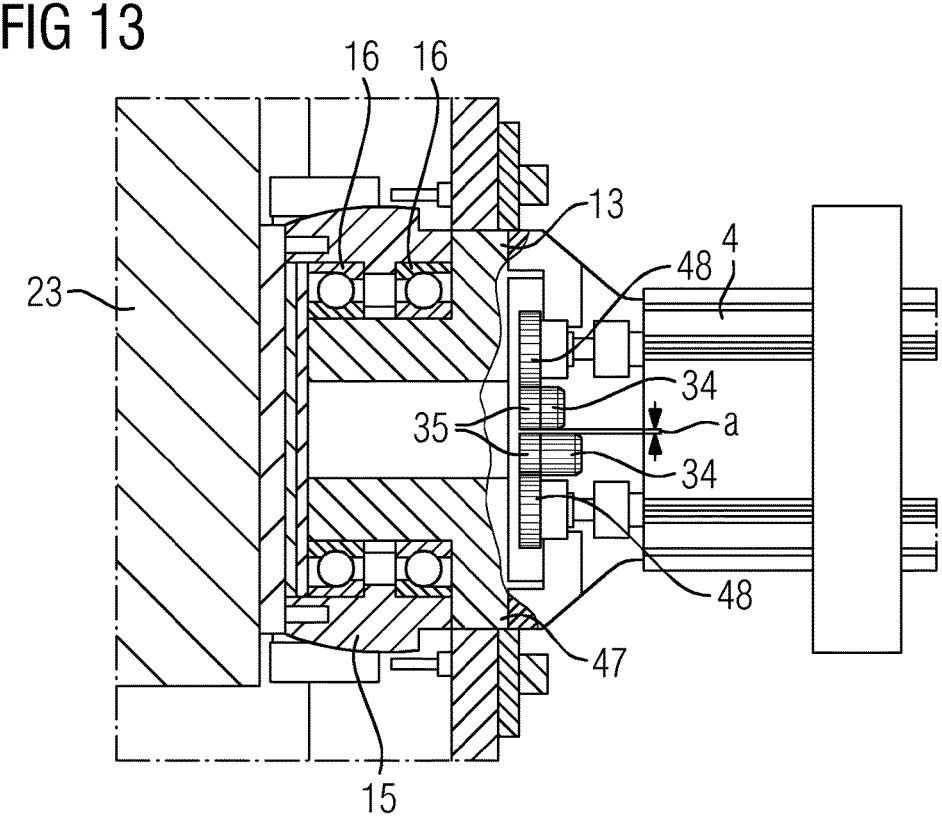
FIG. 13 shows a view which is analogous with respect to FIG. 10, a second guide rod instead of the first guide rod being mounted on the rotational part.

FIG. 13 shows an arrangement which is analogous with respect to FIG. 10, a second flange region 47 of a guide rod 4 being fastened to the first flange region 13 of the rotational part 12, which guide rod 4 differs with regard to its external diameter from the guide rod 4 which is shown in FIG. 10. Said diameter difference of the guide rods 4 is compensated for in a simple way by way of a suitable selection of the further gearwheel 48 which is arranged within the second flange region 47 of the guide rod 4.

Figure 14:
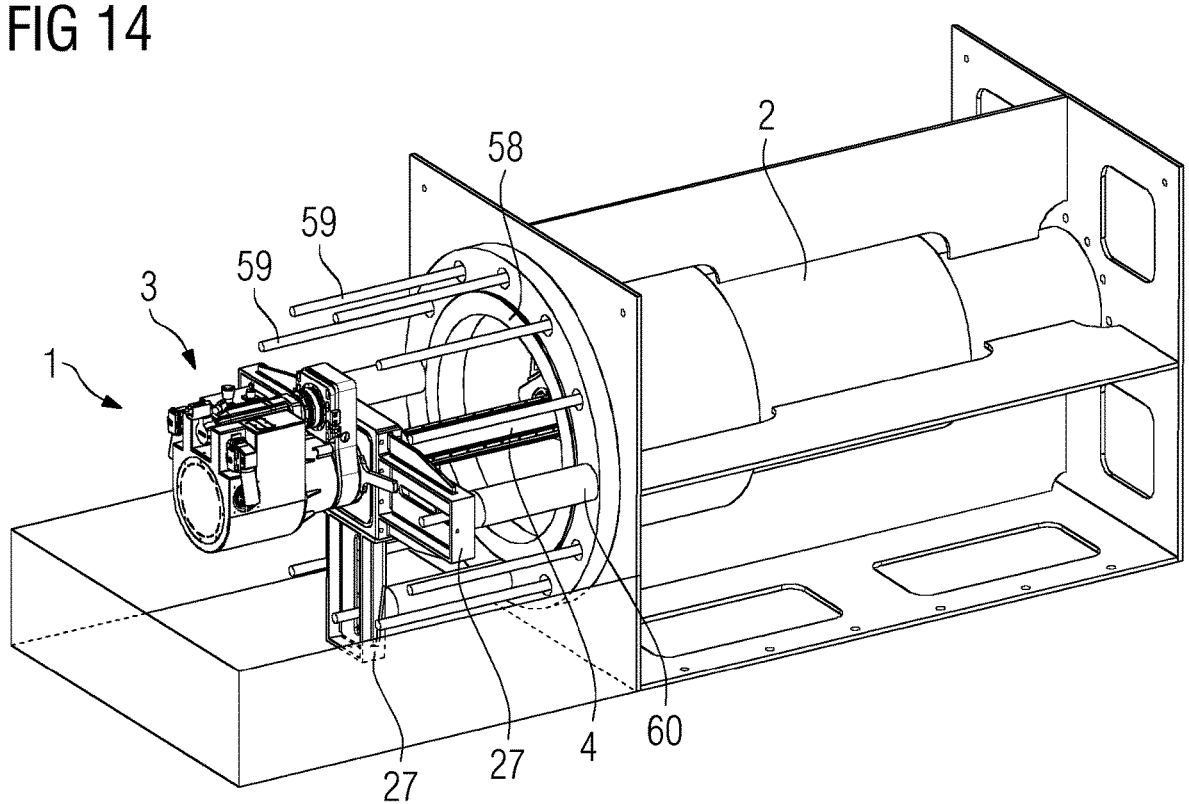
FIG. 14 shows a diagrammatic perspective view which shows the machining system which is shown in FIG. 1 in a state, in which it is mounted on a component to be machined.

FIG. 14 shows the machining system 1 in a state, in which it is fastened to a component 2 to be machined, which is a valve in the present case. The machining system 1 is held firstly via the outer clamping device 8 on the outside of the component 2. To this end, threaded rods 59 are screwed in the region of a fastening flange 58 of the component 2 into threaded bores which already exist, and are fastened to the clamping arms 27 of the outer clamping device 8, a defined spacing between the component 2 and the outer clamping device 8 being defined via spacer sleeves 60 which are pushed over the threaded rods 59, which defined spacing enables a satisfactory view into the component 2 during the setting up of the machining system 1 and during the machining itself. Furthermore, the machining system 1 is supported via the inner clamping device 9 on the inner wall of the component 2, which cannot be seen in FIG. 14, however. To this end, clamping rods 61 which project radially outward from the inner clamping device 9 are pressed against the inner wall of the component 2.

An essential advantage of the construction of the above-described machining system 1 consists, in particular, in that the second and third drive train can have a comparatively simple construction thanks to the arrangement of the gearwheels 34 and 35 which project axially from the rotational part 12 in a central region close to the C-axis. In addition, it is possible without problems on account of this arrangement to optionally fasten different guide rods 4 with different external diameters to the rotational part, since merely suitable further gearwheels 48, 49 are to be arranged on the guide rods 4 in the region of the respective second flange region 47.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A mobile machining system for turning machining of inner faces of hollow-cylindrical components comprising
   a base part,
   a rotational part of hollow configuration, which extends through the base part, is mounted on the base part such that the rotational part is rotatable about a C-axis of the machining system, and a first flange region is on an end side of the rotational part,
   a guide rod which, at one of the guide rod's free ends, has a second flange region, which is connected fixedly to the first flange region of the rotational part such that the second flange region is rotatable with the first flange region,
   a first motor, which is connected fixedly to the base part, wherein the first motor drives the guide rod via a first drive train such that the guide rod rotates about the C-axis,
   a support which is held on the guide rod such that the support is moveable to and fro in directions defined by a Z axis of the machining system, which extends parallel to the C-axis,
   a second motor, which is connected fixedly to the rotational part to rotate with the rotational part, is supplied with power via a slide ring, and drives the support along the Z-axis via a second drive train,
   a tool holder, which is held on the support such that the tool holder is moveable in directions defined by an X-axis of the machining system, which X-axis extends perpendicularly with respect to the Z-axis,
   a third motor, which is connected fixedly to the rotational part to rotate with the rotational part, is supplied with power via the slide ring, and drives the tool holder in the directions defined by the X-axis via a third drive train,
   an outer clamping device, which is connected fixedly to the base part such that the outer clamping device is rotatably fixed relative to the base part, is designed to fasten the base part centrally to an end side of a component to be machined, and
   an inner clamping device, which is mounted on the guide rod, is designed to support the machining system on an inner face of the component to be machined.

2. The machining system as claimed in claim 1,
   wherein the second drive train has at least one gearwheel that is held fixedly in a first gearwheel shaft end region of a first gearwheel shaft so as to rotate with the first gearwheel shaft, the first gearwheel shaft extends through the rotational part and is driven by the second motor,
   wherein the third drive train has at least one gearwheel that is held fixedly in a second gearwheel shaft end region of a second gearwheel shaft so as to rotate with the second gearwheel shaft, the second gearwheel shaft extends through the rotational part and is driven by the third motor,
   wherein the at least one gearwheel of the second drive train and the at least one gearwheel of the third drive train are arranged in a central region of the rotational part and project outward from the rotational part,
   wherein a shortest spacing between tip circle diameters of the at least one gearwheel of the second drive train and the at least one gearwheel of the third drive train being from 15 mm to 45 mm, and
   wherein the second drive train and the third drive train in each case have at least another gearwheel in addition to the at least one gearwheel of each drive train, each of the at least another gearwheel is arranged rotatably on the guide rod within the second flange region and respectively meshes with the at least one gearwheel of the second drive train and the at least one gearwheel of the third drive train.

3. The machining system as claimed in claim 2,
   wherein the second drive train and the third drive train in each case have a planetary gear, the planetary gear of the second drive train is arranged between the second motor and the at least one gearwheel of the second drive train, and the planetary gear of the third drive train is arranged between the third motor and the at least one gearwheel of the third drive train.

4. The machining system as claimed in claim 1,
   wherein a plurality of guide rods of different diameter with associated supports, tool holders and inner clamping devices are provided, the plurality of guide rods having a respective second flange region for fastening to the first flange region of the rotational part.

5. The machining system as claimed in claim 1, wherein the base part, the rotational part, the first motor, the second motor, and the third motor are combined in a single drive module.

* * * * *